(12) United States Patent
Blessing et al.

(10) Patent No.: US 6,305,889 B1
(45) Date of Patent: Oct. 23, 2001

(54) QUICK-MADE CONNECTION FOR A STUD HAVING A SHAPED OUTER PROFILE

(75) Inventors: Mathias Blessing, Frastanz (AT); Ulrich Birnbaum, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/667,745

(22) Filed: Sep. 22, 2000

(30) Foreign Application Priority Data

Sep. 29, 1999 (DE) .................................................. 199 46 578

(51) Int. Cl.⁷ ............................. F16B 21/00; F16B 21/18
(52) U.S. Cl. ........................ 411/353; 411/433; 411/437; 411/512
(58) Field of Search ................................. 411/433, 437, 411/352, 353, 354, 512

(56) References Cited

U.S. PATENT DOCUMENTS

| | | | |
|---|---|---|---|
| 4,666,330 | * 5/1987 | O'Connell | 411/353 X |
| 4,802,700 | * 2/1989 | Stevenson et al. | 411/353 X |
| 5,073,071 | * 12/1991 | Herwig et al. | 411/353 |
| 5,098,241 | * 3/1992 | Aldridge et al. | 411/433 |

* cited by examiner

*Primary Examiner*—Neill Wilson
(74) *Attorney, Agent, or Firm*—Sidley Austin Brown & Wood, LLP

(57) ABSTRACT

A quick-made connection for a stud (2; 22; 52) having a shaped outer profile (3; 23; 53), the connection including a receiving member (4; 24; 32; 42; 59) having a bore (5; 25; 33; 43; 54) in which the stud (2; 22; 52) is received, and at least one locking member arranged in the bore of the receiving member and formlockingly engageable in the shaped outer profile (3; 23; 53) of the stud (2; 22; 52), with the bore (5; 25; 33; 43; 52) having at least one section (9; 29; 34; 44; 55; 56) tapering toward an insertion opening of the bore, with the locking member (10; 30; 36; 46; 57; 58) being formed as a radially elastically expandable ring member preloaded against the wall of the bore and having an inner diameter (w) which is smaller than a bore diameter (d) at its entrance opening.

5 Claims, 3 Drawing Sheets

QUICK-MADE CONNECTION FOR A STUD HAVING A SHAPED OUTER PROFILE

BACKGROUND OF THE INVENTION

1. Field of the Invention

The present invention relates to a quick-made connection for a stud, bolt, or the like having a shaped outer profile, the connection including a receiving member having a bore in which the stud is received, and at least one locking member arranged in the bore of the receiving member and formlockingly engageable in the shaped outer profile of the stud. For the sake of brevity, below, the discussion will proceed only with a reference to a stud.

2. Description of the Prior Act

One of the most often used methods of connecting two or more parts is a method of connecting the parts by screwing them to each other. To this end, usually, a threaded bolt or a stud and a nut are used, with the stud and the nut having, respectively, complementary outer and inner threads. The connectable parts can be connected either with a stud(s) or with a nut(s). Often, the stud is formed as a component of one of the connectable parts. The second part is provided with a bore into which the threaded bolt is inserted, with a nut being screwed on the outer thread of the stud. Also, a nut can be formed as a component of a connectable part. The threaded stud can, e.g., be formed as a, e.g., threaded rod or pin connectable with a pipe holder. The nut can be arranged in a ceiling, a wall, or a constructional component and be used for suspending the pipe holder (clip, clamp, ets...) from the ceiling or for securing it to the ceiling.

A drawback of the conventional threaded connection generally consists in its relatively large length, i.e., the threaded portion of the threaded member should have a sufficiently large length over which the nut should be screwed in order to obtain a strong connection between the nut and the threaded member. In order to insure a simple an easy winding of the nut over the stud, the outer thread should be free of any damage. The thread can be damaged, e.g., when the threaded stud is cut to a desired length. In order to insure that the run-on end of the thread is suitable fore a nut to be screwed on, often, the stud need be subjected to additional treatment.

A further drawback of the conventional threaded connection consists in that only threaded elements having the same kind of thread can be connected with each other. Prior art discloses a number of quick-made (quick-release) connections. However, they, in most cases, do not meet the requirements of fire-protection regulations and, in many cases, cannot withstand large loads. Further, in a sanitary field, nuts of plastic material are used which are displaced over a tilted threaded stud and are screwed down upon the stud being titled back. These plastic nuts can be screwed on primarily only manually, and because of their inflammability cannot be used for suspending fire curtains or for similar safety-relevant attachments. The nuts made of a fire-resistant materials, e.g., of aluminum, sheet metal, do not have properties that would make them suitable for quick-made (quick-release) connection, and often are formed of a thin material and cannot withstand the necessary loads.

Accordingly, an object of the present invention is to provide a quick-made (quick-release) connection system for a stud having an outer tread in which the drawbacks of a prior art connections are eliminated.

Another object of the present invention is to provide quick-made (quick-release) connection which can be effected rapidly, in a simple manner, and without a lengthy screwing process or a large expenditure of force.

A further object of the present invention is to provide a quick-made (quick-release) connection that would meet the requirements of fire-protection regulation and regarding the obtainable load values.

A still further object to the present invention is to provide a quick-made (quick-release) connection which is easily releasable, if needed, and which can be used for repeated connection and release.

A yet another object of the present invention is a quick-made (quick-release) connection which would eliminate the need in subsequent, after cutting off, treatment of a threaded stud. After the run-on end of the thread has been damaged as a result of cutting, and which would provide, at the same time or an easy quick connection.

A still another object of the present invention is to provide a quick-made (quick-release) connection usable with studs having different types of threads.

SUMMARY OF THE INVENTION

These and other objects of the present invention, which will become apparent hereinafter, are achieved by providing a quick-made (quick-release) connection including a receiving member having a bore in which the stud is received, and at least one locking member arranged in the bore of the receiving member and formlockingly engageable in the shaped outer profile of the stud. The bore has at least one section tapering toward an insertion opening of the bore. The locking member is formed as a radially elastically expandable ring member held in the bore without a possibility of displacement in an insertion direction and is preloaded against an inner wall of the bore. An inner diameter of the ring member is smaller than a diameter of the bore at the insertion opening.

The axial positioning of a stud, bolt, ets... provided with a shaped outer profile is effected quickly and in simple manner by merely inserting the stud or the like in the bore in the receiving member to a predetermined height. A lengthy screw-in process is eliminated. The leading end of the stud widens or expands the ring member radially, with the ring member being secured against an axial displacement in the insertion direction. Due to its elasticity, the ring member formlockingly latches in the shaped outer profile of the stud. Upon application of a tensioning load, the ring member displaces slightly along the tapering inner surface of the bore. As a result, it becomes radially compressed, whereby the forcelocking connection between the ring member and the stud is complemented with a formlocking connection and is strengthened. An easy release of the form locking connection becomes possible due to the shape of the shaped outer profile of the stud. In the case the outer profile is formed as a thread, the stud can easily be screwed out. The height adjustment is effected in a simple manner by selecting the length of the stud to be inserted into the bore. The subsequent, after cutting-off, treatment of the stud can be eliminated as the securing of the stud is effected without cooperation of complementary outer and inner threads, but rather independent from the quality of the thread run-on end, by simply inserting the stud into the bore. Due to the structure of the receiving member, it is not any more necessary that the connectable elements have the same thread parts. The quick-made connection mechanism can function with the receiving and received members having different types of the thread of profiles. The ring member latches in the outer profile of almost any type and having an annular or helical circumferential indentation in the stud outer surface.

In order to facilitate an elastic radial expansion of the ring member or its compression upon application of a tensioning load, the ring member is provided, in its circumference, with a separation opening. In this case, the ring member is formed essentially as an elastic snap ring.

Radial expansion and compression of the ring member is insured by forming it of a spring steel. Advantageously, the bore is provided with an annular circumferential shoulder against which the ring member is supported, whereby the ring member axial displacement is prevented during insertion of the stud. The annular shoulder at that is rather easily formed.

In accordance with another embodiment of the invention, the ring member forms part of a one-piece elastic shackle having two pairs of shackle members arranged diametrically opposite each other with the shackle member projection axially from the ring member and extending parallel to each other. The shackle members have outwardly bent, hooked free ends for supporting the ring member on the receiving member in the axial direction.

The elastic shackle is formed of a piece of spring wire and, e.g., is hung on the receiving member, extending from the insertion opening and having its hooked end supported on the receiving member. The radial compressibility of the ring member facilitate the insertion of the shackle until it reaches the widen bore region, whereupon the ring member expands. The taper of the respective section of the bore prevents the ring member from falling out.

The formlocking connection between the stud and the ring member can be very easily manually broken by having the hooked free ends of at least one pair of shackle member cross each other so that they form a handle, with which the ring member can be easily compressed.

To facilitate height adjustment of the stud and for its precise positioning, the ring member is held in the bore of the receiving member without of a possibility of rotation relative thereto.

The quick-made connection according to the present invention proved to be particularly advantageous when used with a stud the outer profile of which is formed as an outer thread. At that, it does not matter whether the thread is a metric thread, British Standard Whitworth thread, or any other thread. With a threaded stud the height adjustment can be effected particularly easily. After rough positioning by the insertion of the stud in the receiving member, the fine adjustment is performed by screwing the stud in or out of the bore. The stud can be easily withdrawn from the bore by being screwed out.

The bore in the receiving member can be formed as a blind bore. With regard to height adjustment, it is advantageous when the bore is formed as an axial through-bore.

For increasing the obtainable load-resistant values of the connection, there can be provided a plurality of locking members arranged in the bore axially one behind another. The bore has a plurality of bore sections for receiving the locking members of the plurality of locking members, respectively, and tapering each in the direction toward the insertion opening of the receiving member. Alternatively, a single tapering bore section for receiving locking members having different diameters can be provided. However, generally, the locking members and the respective bore sections are substantially identical which significantly strengthens the form locking connection of the locking members with the stud upon radial compression of the locking members under a tensioning load.

The novel features of the present invention, which are considered as characteristic for the invention, are set forth in the appended claims. The invention itself, however, both as to its construction and its mode of operation, together with additional advantages and objections thereof, will be best understood from the following detailed description of preferred embodiments, when read with reference to the accompanying drawings.

DETAILED DESCRIPTION OF THE PREFERRED EMBODIMENT

Figure 1:
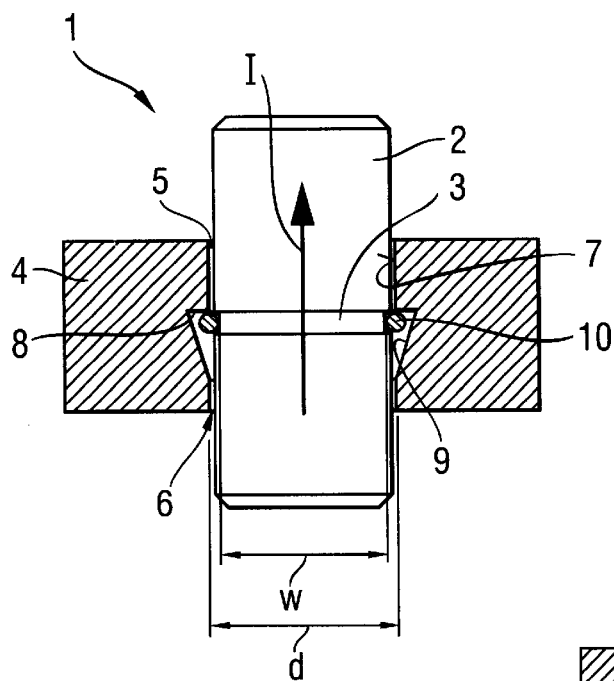
FIG. 1 a cross-sectional view of a first embodiment of a quick-made connection according to the present invention.

A quick-made connection according to the present invention for a stud and which is shown in FIG. 1, is designated generally with a reference numeral 1. The connection 1 includes a receiving member 4 having a bore 5 for receiving a stud 2 having a shaped outer profile 3, and a locking member 10 located in the bore 5. The receiving member 5 can be a separate element and can be formed as a nut. However, it can also be formed as a component of a connection element and be provided in a ceiling, a wall and the like. The stud 2 can, e.g., project from a constructional component or be provided with connection elements for mounting another constructional component, e.g., a pipe clamp. The shaped outer profile 3 of the stud 2 can be formed, e.g., as an annular groove.

In the embodiment shown in FIG. 1, only one annular groove 3 is shown. It should be understood that the stud 2 can be provided along its longitudinal extent with several grooves 3 or with a thread. The bore 5 in the receiving member 4 has a diameter which is somewhat bigger than the outer diameter d the stud 2. The locking member 10, which is arranged in the bore 5 is formed as a radially expandable ring member. The ring-shaped locking member 10 is arranged in a widen region of the bore 5. In the insertion direction, which is designated with an arrow I, the locking member 10 is supported against an annular shoulder 8. Starting from the shoulder 8, a locking member-receiving region 9 tapers toward the insertion opening 6 of the bore 5. The locking member 10 is so dimensioned that it is pre-loaded against the inner wall 7 of the bore 5. The ring-shaped locking member 10 has an inner diameter W which is smaller than the diameter d of the bore 5 in the region of the insertion opening 6.

Upon insertion of the stud 2 in the bore 5, the locking member 10 is expanded radially by the leading free end of the stud 2 and becomes, due to its springiness, locked in the circumferential groove 3 formed in the outer surface of the stud 2. The shoulder 8 retains the locking member 10 in the bore 5. Under a tensioning load, the locking member 10 is moved somewhat in the direction of the insertion opening 6 in the receiving member 4. As a result, the locking member 10 becomes slightly compressed by the conical section 9 of the bore 5. This amplifies the formlocking connection between the locking member 10 and the stud 2. When several annular grooves 3 are formed in the surface of the stud 2, the stud 2 can be pushed into the bore 5 until the locking member 10 is engaged in a groove 3 corresponding to a desired insertion length of the stud 2 beyond the receiving member 4 in the insertion direction I.

Figure 2:
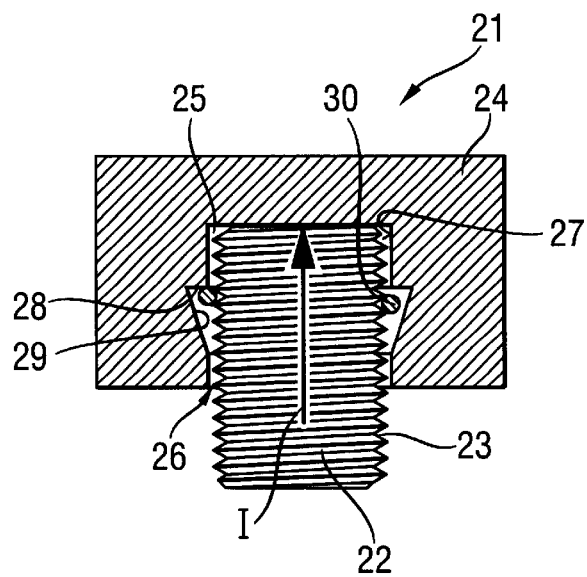
FIG. 2 a cross-sectional view of a second embodiment of a quick-made connection according to the present invention.

In the second embodiment of a quick-made connection according to the present invention, which is shown in FIG. 2, the elements similar to those of FIG. 1 are designated with the same reference numerals increased by 20. The second embodiment differs from the first one in that the receiving member 24 has a blind bore 25. The stud 22 is provided with an outer thread 23. The outer thread 23 can be formed as a metric thread, British Standard Whitworth thread, or any other thread. The stud 22, which is formed as a threaded pin, can be rapidly connected formlockingly with the receiving member 24, independent on what type of thread the stud 22 has. The height adjustment is effected by inserting the threaded stud 22 by a desired amount, or by screwing the stud 22 in the bore 25 by a desized length, or by unscrewing the stud 22 from the bore 25. The thread 23 provides for an easy dismounting or disengagement of the stud 22 with respect to the receiving member 24. There also exists a possibility to screw the stud 22 until it abuts the bore bottom in order to eliminate a possible backlash.

Figure 3:
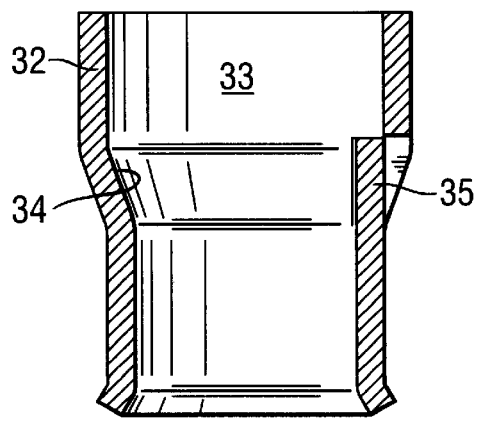
FIG. 3 a cross-sectional view of an element of a quick-made connection according to a third embodiment.
Figure 4:
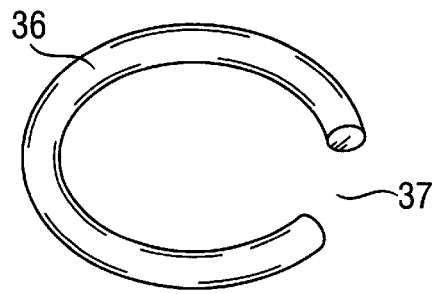
FIG. 4 a perspective view of another element of a quick-made connection according to the third embodiment.

FIGS. 3 and 4 show two elements of a third embodiment of a quick-made connection according to the present invention. In FIGS. 3, the receiving member 32 has a bore 33 that somewhat tapers toward the insertion opening, forming a somewhat conical section 34. The receiving member 32 is provided in the bore 33 with a rotation preventing element 35 for a locking member 36 shown in FIG. 4. The rotation preventing element 35 is formed as a strip-shaped nose projecting radially into the bore 33. The nose-shaped rotation preventing element 35 projects into a disconnection opening 37 in the ring-shaped elastic locking member 36 and prevents it from rotation.

Figure 5:
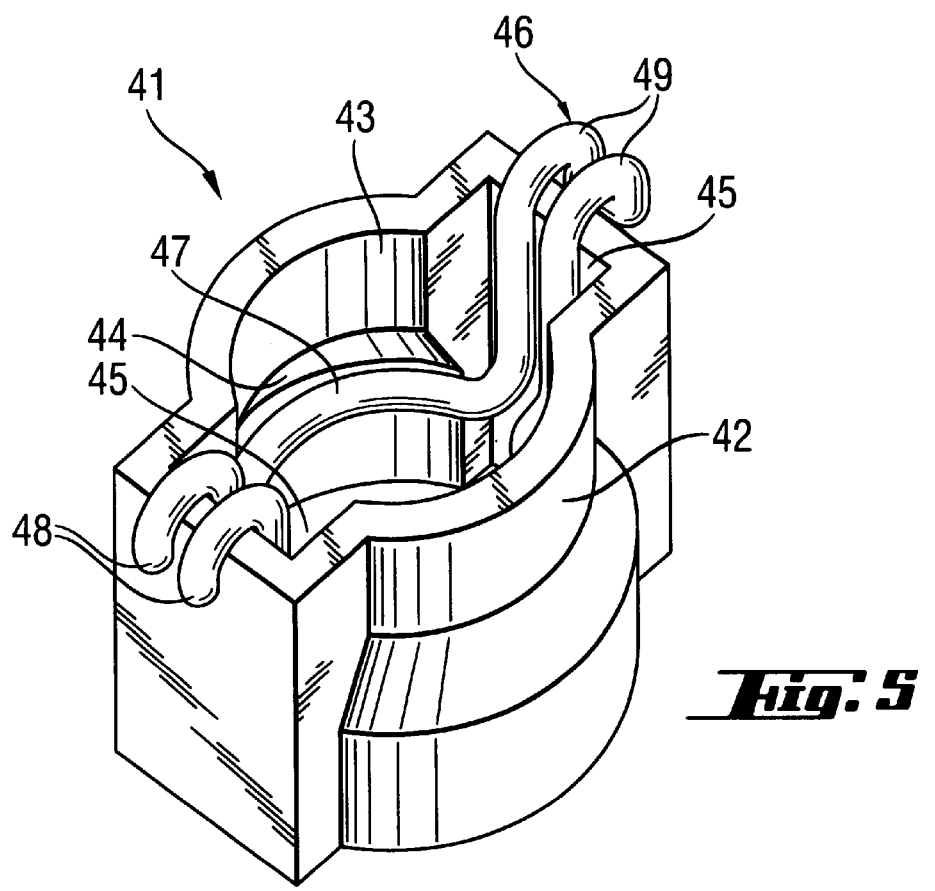
FIG. 5 a perspective view of a fourth embodiment of a quick-made connection according to the present invention.

FIG. 5 shows another embodiment of a quick-made connection according to the present invention, which is generally designated with a reference numeral 41. For the sake of clarify, in the perspective view shown in FIG. 5, a stud provided with a circumferential groove(s) or a thread, is not shown. In the embodiment of FIG. 5, the receiving member 42 has a bore 43. The bore 43 has a widen section 44 which somewhat tapers toward the insertion opening. The bore 43 has two opposite expanded sections 45 the function of which will be explained below. A locking member 46 is arranged in the widen section 44. The locking member 46 is formed as a one-piece bent elastic wire shackle having two wire shackle members 48, 49 projecting from a ring member 47 on opposite sides thereof. The wire shackle members 49 are connected with each other. The opposite wire shackle members 48 are separated from each other by a slot. At their ends remote from the ring member 47, which can form part of the locking member 46, the wire shackles 48, 49 have hook-shaped ends which hang on the outer sides of the expanded sections 45. The wire shackle members 48, 49 provide for an easy mounting of the ring members 47 in the widen section 44 of the receiving member 42.

Upon insertion, the stud widens the ring member 47 radially. The ring member 47 forms a formlocking connection with the outer profile of the stud, be it a thread or an annular groove. For releasing the from-locking connection, the spaced shackle members 48 can be disengaged with a blade of, e.g., a screwdriver. Thereafter, the stud can be easily withdrawn.

Figure 6:
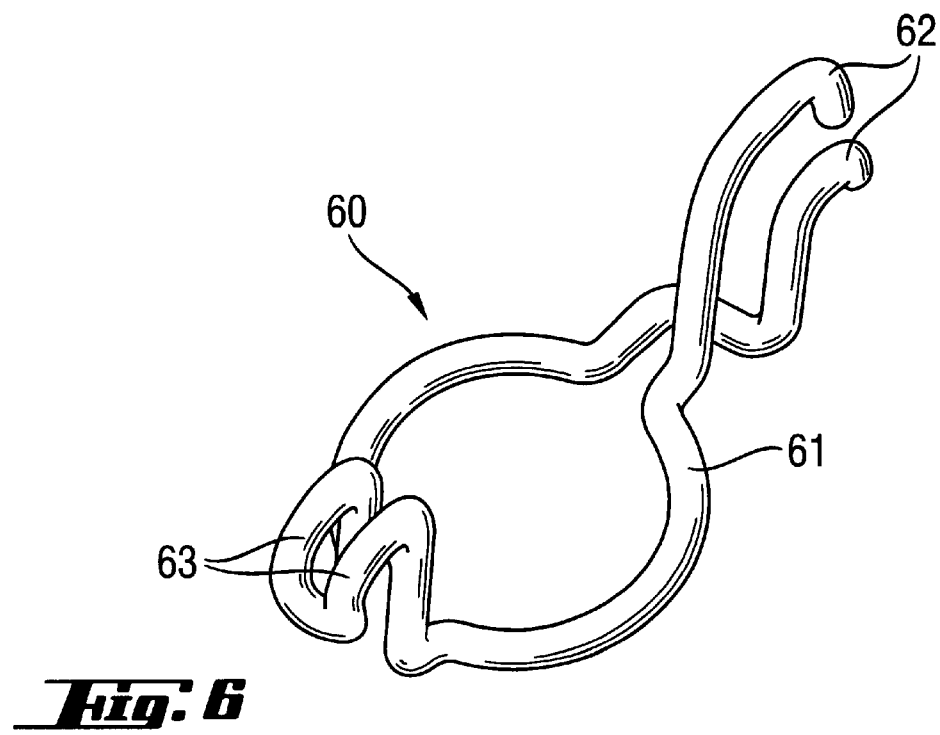
FIG. 6 a perspective view of an element of the quick-made connection shown in FIG. 5.

FIG. 6 shown an embodiment of one-piece elastic wire shackle 60 which can be hung on a receiving member 42 shown in FIG. 5. The elastic wire shackle 60 includes a ring member 61 with two oppositely located shackle pairs 62, 63 projecting therefrom. The shackle members of the shackle pairs 62, 63 have hooked free ends. The shackle members of the shackle pair 63 are connected with each other. The shackle members of the opposite shackle pair 62 have crossed shackle arms. The crossing each other shackle arms form a handle that can be used to spread the shackle members 62 in case the formlockingly held stud needs to be withdrawn.

Figure 7:
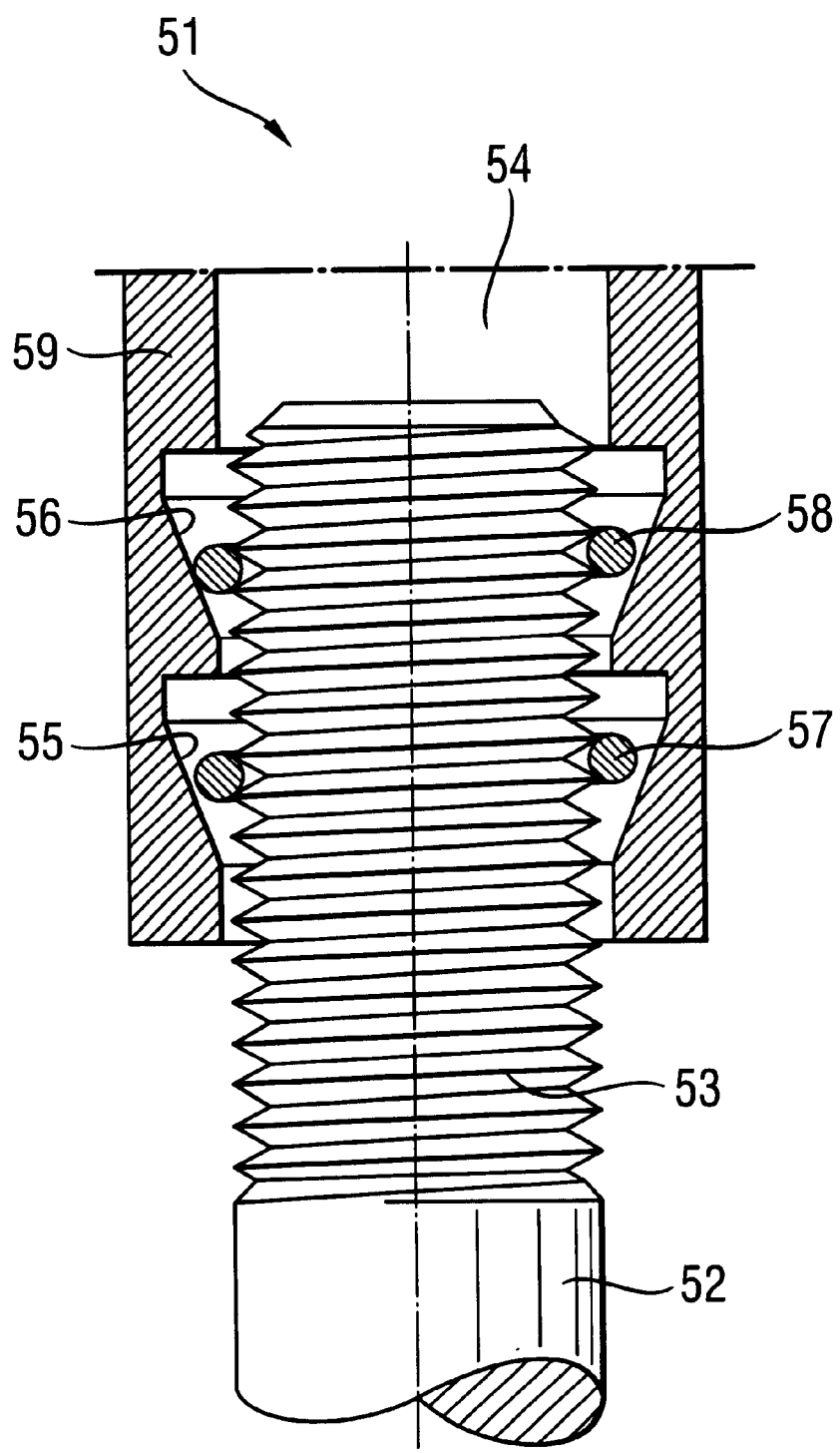
FIG. 7 a cross-sectional view of a fifth embodiment of a quick-made connection according to the present inanition.

In the embodiment shown in FIG. 7, in order to achieve larger separation resistance values, in the bore 54 of the receiving member 59 of the quick-made connection 51, there are arranged two locking members 57, 58 which are located in widenings 55, 56. The widenings 55, 56 taper toward the insertion opening of the bore 54. Upon insertion of a threaded stud 52 having an outer thread 53, the locking members 57, 58 are formlockingly latched in the windings of the outer thread 53. Upon application of a tensioning load, the locking members 57, 58 slides along conical surfaces of the widenings 55, 56 and are radially compressed. Thereby high load values are achieved.

Though the present invention was shown and described with references to the preferred embodiments, such are merely illustrative of the present invention and are not to be construed as a limitation thereof and various art. It is therefore not intended that the present invention be limited to the disclosed embodiments or details thereof, and the present invention includes all variations and/or alternative embodiments within the spirit and scope of the present invention as defined by the appended claims.

What is claimed is:

1. A quick-made connection for a stud (2; 22; 52) having a shaped outer profile (3; 23; 53), comprising a receiving member (4; 24; 32; 42; 59) having a bore (5; 25; 33; 43; 54) in which the stud (2; 22; 52) is received; and at lest one locking member and formlockingly engageable in the shaped outer profile (3; 23; 53) of the stud (2; 22; 52), with the bore (5; 25; 33; 43; 52) having at least one section (9; 29; 34; 44; 55; 56) tapering toward an insertion opening (6; 26) of the bore, with the locking member (10; 30; 36; 46; 57; 58) being formed as a radially elastically expandable ring member held in the bore (5; 25; 33; 43; 54) without a possibility of an essential displacement in an insertion direction (I), and being preloaded against an inner wall (7; 27) of the bore, and with an inner diameter (w) of the ring member (10; 30; 36; 46; 57; 58) being smaller than a diameter (d) of the bore (5; 25; 33; 43; 54) at an insertion opening (6; 26) thereof;

wherein the ring member (36; 46; 60) has a separation opening (37) in a circumferential direction;

wherein the ring member is formed of spring steel; and wherein the ring member (46; 60) forms part of a one-piece elastic shackle having two pairs of shackle member arranged diametrically opposite each other, with the shackle members projecting axially from the ring member and extending parallel to each other, the shackle members having outwardly bent, hooked free ends and providing for support of the ring member on the receiving member in the axial direction.

2. A quick made connection according to claim 1, wherein the shackle members of one (62) of the shackle member pairs have the hooked free ends thereof crossing each other, forming a handle for compressing the ring member (61).

3. A quick-made connection for a stud (2; 22; 52) having a shaped outer profile (3; 23; 53), comprising a receiving member (4; 24;32; 42; 59) having a bore (5; 25; 33; 43; 54) in which the stud (2; 22; 52) is received; and at least one locking member (10; 30; 36; 46; 57; 58) arranged in the bore of the receiving member and formlockingly engageable in the shaped outer profile (3; 23; 53) of the stud (2; 22; 52;) with the bore (5; 25; 33; 43; 52) having at least one section (9; 29; 34; 44; 55; 56) tapering toward and insertion opening (6; 26;) of the bore, with the locking member (10; 30; 36; 46; 57; 58) being formed as a radially elastically expandable ring member held in the bore (5; 25; 33; 43; 54) without a possibility of an essential displacement in an insertion direction (I), and being preloaded against an inner wall (7, 27) of the bore, and with an inner diameter (w) of the ring member (10; 30; 36; 46; 57; 58) being smaller than a diameter (d) of the bore (5; 25; 33; 43; 54) at an insertion opening (6; 26) thereof, wherein the ring member (46; 60) forms part of a one-piece elastic shackle having two pairs of shackle member arranged diametrically opposite each other, with the shackle member projecting axially from the ring member and extending parallel to each other, the shackle members having outwardly bent, hooked free ends and providing for support of the ring member on the receiving member in an axial direction.

4. A quick-made connection according to claim 3, wherein the ring member (36; 47; 61) is essentially held in the bore without a possibility of rotation.

5. A quick-made connection according to claim 3, wherein the bore (5; 53; 43; 54) of the receiving member (4; 32; 42; 59) is formed as a through-bore.

* * * * *